US010071713B2

(12) United States Patent
Caillot et al.

(10) Patent No.: US 10,071,713 B2
(45) Date of Patent: Sep. 11, 2018

(54) PLASTIC HEAT-CONDUCTING COMPONENT FOR A SYSTEM FOR SUPPLYING AND/OR DISTRIBUTING A WINDOW-WASHING LIQUID FOR A MOTOR VEHICLE

(71) Applicant: Valeo Systèmes d'Essuyage, Le Mesnil Saint Denis (FR)

(72) Inventors: Gérald Caillot, Cernay la Ville (FR); Vincent Izabel, Chilly Mazarin (FR); Jean-Michel Jarasson, Le Mesnil Saint Denis (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 786 days.

(21) Appl. No.: 14/365,650

(22) PCT Filed: Dec. 10, 2012

(86) PCT No.: PCT/EP2012/074908
§ 371 (c)(1),
(2) Date: Jun. 16, 2014

(87) PCT Pub. No.: WO2013/092266
PCT Pub. Date: Jun. 27, 2013

(65) Prior Publication Data
US 2014/0352095 A1   Dec. 4, 2014

(30) Foreign Application Priority Data

Dec. 19, 2011  (FR) ..................................... 11 61868

(51) Int. Cl.
*B60S 1/46*    (2006.01)
*B60S 1/48*    (2006.01)
(Continued)

(52) U.S. Cl.
CPC ................ *B60S 1/482* (2013.01); *B05B 1/24* (2013.01); *B60S 1/488* (2013.01); *B60S 1/50* (2013.01);
(Continued)

(58) Field of Classification Search
CPC ...... B60S 1/40; B60S 1/48; B60S 1/50; B60S 1/3862; B60S 1/488; B60S 1/487; B60S 1/522; B60S 1/524
(Continued)

(56) References Cited

U.S. PATENT DOCUMENTS 4,090,668 A  *  5/1978  Kochenour ............. B60S 1/481
                                              15/250.04
4,815,769 A  *  3/1989  Hopperdietzel .......... B05B 1/24
                                              138/33
(Continued)

FOREIGN PATENT DOCUMENTS

DE    3825330 A1    2/1990
EP    0050329 A2    4/1982
(Continued)

OTHER PUBLICATIONS

Notification of Reason for Rejection issued in corresponding Japanese Patent Application No. 2014-547837, dated Oct. 18, 2016 (8 pages).
(Continued)

Primary Examiner — Gary Graham
(74) Attorney, Agent, or Firm — Osha Liang LLP

(57) ABSTRACT

The invention relates to a component (10) for a system (9) for supplying and/or distributing a liquid for a wiping apparatus for a motor vehicle, including a space, defined by a wall, in which the liquid can be accommodated, characterized in that the wall is made of a plastic heat-conducting material. The invention can be used for motor vehicles.

12 Claims, 3 Drawing Sheets

Figure 1:
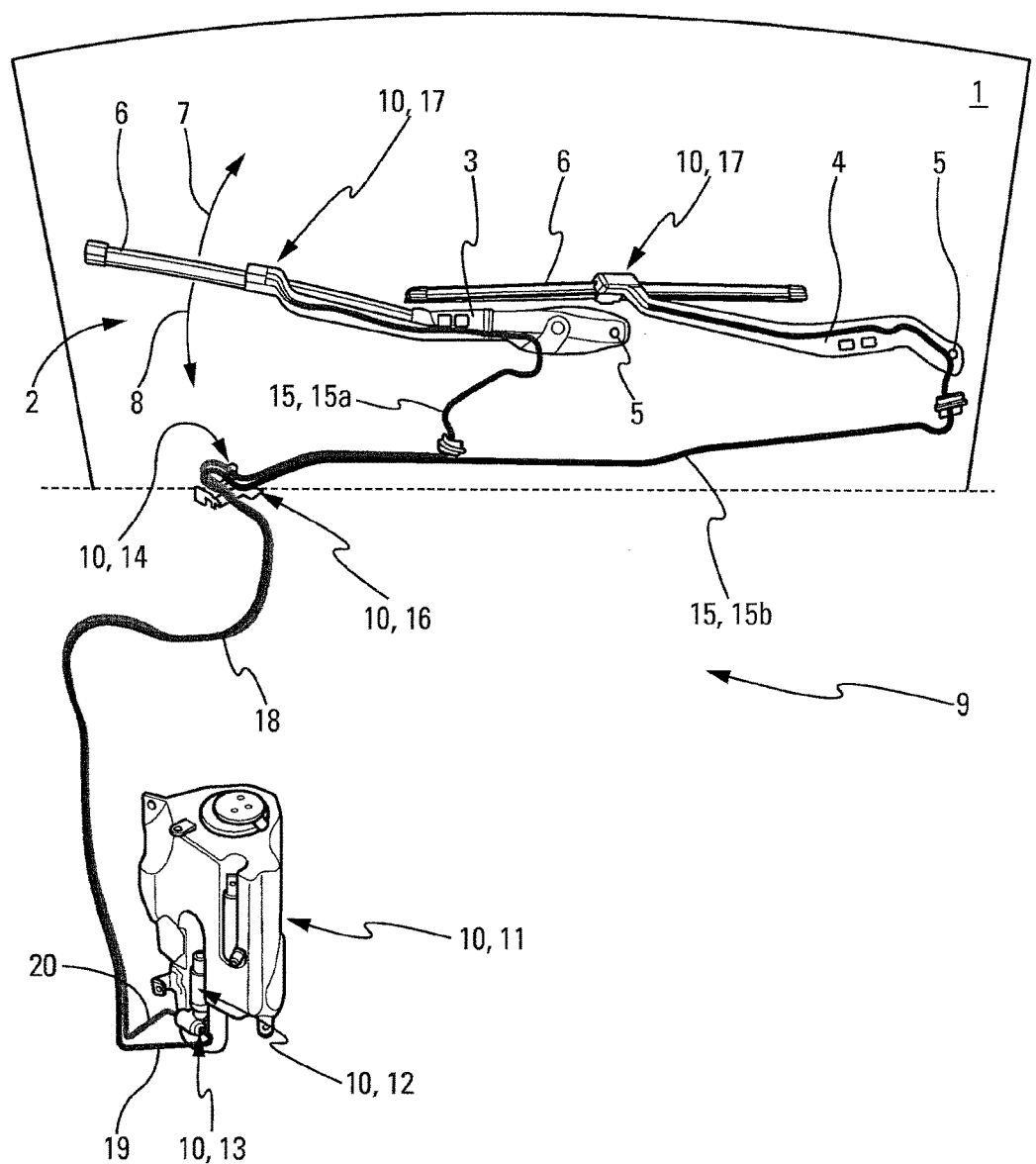

(51) Int. Cl.
*B60S 1/50* (2006.01)
*B05B 1/24* (2006.01)
*F24H 1/18* (2006.01)
*H05B 1/02* (2006.01)
*F16L 11/12* (2006.01)
*H05B 3/58* (2006.01)
*F24H 1/00* (2006.01)
*B05B 9/00* (2006.01)
*B60S 1/52* (2006.01)

(52) U.S. Cl.
CPC .............. *F24H 1/185* (2013.01); *B05B 9/002* (2013.01); *B60S 1/48* (2013.01); *B60S 1/522* (2013.01); *F16L 11/12* (2013.01); *F24H 1/009* (2013.01); *H05B 1/0236* (2013.01); *H05B 1/0244* (2013.01); *H05B 3/58* (2013.01)

(58) Field of Classification Search
USPC .............. 15/250.32, 250.04, 250.02, 250.01
See application file for complete search history.

(56) References Cited

U.S. PATENT DOCUMENTS

| | | | | |
|---|---|---|---|---|
| 5,979,796 | A | * | 11/1999 | Ponziani .................. B60S 1/52 219/202 |
| 2012/0167327 | A1 | * | 7/2012 | Kasack .................. B60S 1/488 15/250.04 |
| 2012/0255163 | A1 | * | 10/2012 | Stein ..................... F16L 53/008 29/650 |
| 2015/0069290 | A1 | * | 3/2015 | Guo ........................ C09K 5/14 252/75 |
| 2016/0135253 | A1 | * | 5/2016 | Tomovic ............... B60S 1/3805 252/511 |

FOREIGN PATENT DOCUMENTS

| | | |
|---|---|---|
| EP | 0284669 B1 | 2/1991 |
| EP | 1 777 452 A2 | 4/2007 |
| FR | 2 634 709 A1 | 2/1990 |
| JP | S56-127041 | 2/1981 |
| JP | H3-77762 | 8/1991 |
| WO | 2010/034447 A1 | 4/2010 |
| WO | 2011/032679 A1 | 3/2011 |
| WO | 2011042319 A1 | 4/2011 |

OTHER PUBLICATIONS

International Search Report for corresponding International Application No. PCT/EP2012/074908, dated Mar. 28, 2013 (3 pages).
First Office Action in corresponding Chinese Application No. 201280070083.0 dated Nov. 4, 2015 (14 pages).

* cited by examiner

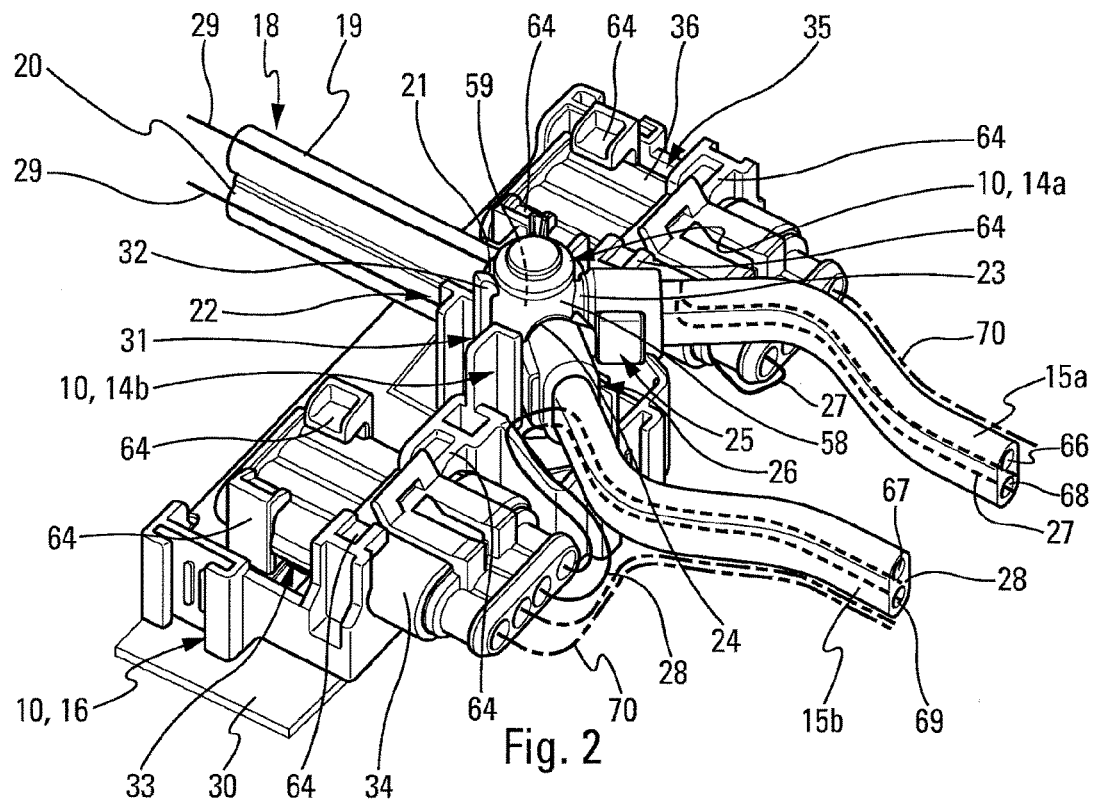
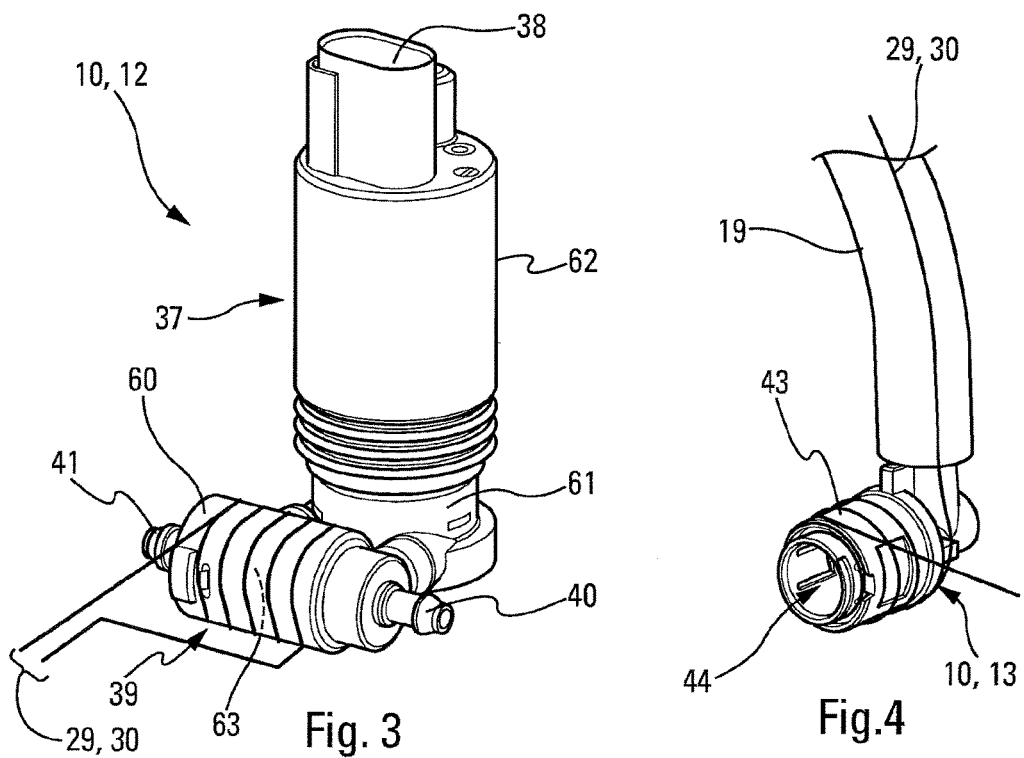

PLASTIC HEAT-CONDUCTING COMPONENT FOR A SYSTEM FOR SUPPLYING AND/OR DISTRIBUTING A WINDOW-WASHING LIQUID FOR A MOTOR VEHICLE

The technical field of the present invention is that of window-washing liquid supply and/or distribution systems for motor vehicles. Such a system accompanies a vehicle windscreen wiping installation.

Motor vehicles are commonly equipped with a wiping installation and washing system to handle the wiping and washing of the windscreen and prevent the vision the driver has of his or her environment from being disrupted. These wiping installations comprise arms performing an angular to-and-fro movement with elongate wipers fitted onto their ends, which in turn bear scraper blades of an elastic material. These blades rub against the windscreen and dispel the water taking it outside the field of vision of the driver. The wiper is attached to the rotating arm of the windscreen wiper by an assembly consisting of a mechanical connector and an adapter. The connector is a part which is fastened directly onto the structure of the wiper, the adapter being an intermediate part which enables the connector to be fastened onto the arm of the windscreen wiper. These two parts are linked to one another by a transversal axis which allows their relative rotation.

The washing systems comprise a device for feeding a windscreen-washing liquid which is routed from a tank situated in the vehicle and which is sprayed toward the windscreen by nozzles that are generally situated on the hood, on the windscreen bay grill or on the windscreen wiper itself for a better distribution of the liquid. In the case of nozzles placed on the wipers, the windscreen-washing liquid is routed, before being distributed between them, by pipes which are fastened onto the arm of the windscreen wiper and which are coupled to a wiper distribution system at the connector level. The connector thus includes orifices suitable for receiving, via a leak-tight link, the end-pieces of said pipes.

When the temperature of the windscreen-washing liquid is too low, for example below 5° C., the windscreen-washing liquid is heated. For this, a transport duct reheats the windscreen-washing liquid taken from a tank by a pump when the windscreen-washing control is activated, generally by the control lever placed alongside the steering wheel and controlling, among other things, the actuation of the windscreen wipers.

Coupling elements are fitted between liquid transport duct portions. Such coupling elements are not heated and are thus likely to form a cold zone, where the liquid freezes. This situation is an annoyance because this freezing, at discrete points that are difficult to access of the liquid supply and/or distribution system, can render the washing function totally unavailable.

The document WO2011/032679 proposes a solution to this problem by installing an electric heating means in the coupling element. Now, the provision of this heating means does not solve the technical problem satisfactorily. In fact, the distance which separates the heating means from the ducts to be defrosted is relatively great, so that the time needed to defrost the channels of the coupling element is not compatible with the level of service expected by a user of the vehicle, particularly when the latter is a high-end vehicle. This represents a first drawback.

Moreover, the spot provision of the heating element demands significant electrical power to succeed in defrosting the channels. Such power is problematical because it requires an electrical network dimensioned for such power. This forms a second drawback.

The invention proposes to improve the situation.

The aim of the present invention is therefore to resolve the drawbacks described above primarily by producing the components of the liquid supply and/or distribution system situated upstream of, downstream of or between the ducts, in a plastic material specially designed to conduct the calories and transmit them to the liquid present in a zone formed in the component, this zone forming in particular a storage zone or a circulation zone in which the liquid can be contained or can circulate.

The subject of the invention is therefore a component of a liquid supply and/or distribution system of a wiping installation for a motor vehicle, comprising a space delimited by a wall in which the liquid can spread, characterized in that the wall is made of a heat-conducting plastic material. "Plastic material" should be understood to mean a synthetic polymeric material.

According to a first feature of the invention, the plastic material exhibits a thermal diffusivity greater than or equal to 0.00019 m$^2$/s.

According to a second feature of the invention, the plastic material is a charged polyethylene, notably charged with nanofibers.

Optionally, the heat-conducting plastic material is also electrically insulating.

According to a first variant of the invention, the component is a liquid retention tank, said wall of the tank comprising at least one orifice for filling said space with liquid and at least one hole suitable for receiving a pump for circulating the liquid in the supply and/or distribution system. Such a tank is the container which retains a quantity of liquid to be used in multiple uses of the windscreen washing function. Since this tank is likely to freeze up, the invention proposes producing the wall of this tank in a heat-conducting plastic so as to dissipate the calories all around the volume consisting of the liquid stock present in the tank.

According to a second, alternative or complementary, variant, the component is a pump for circulating the liquid in the supply and/or distribution system. Such a pump comprises a body which houses an electric motor and a turbine, the body of the pump then being made of a heat-conducting plastic material. Advantageously, only the portion of the body surrounding the turbine is made of such a material.

According to a third variant, an alternative to or complementing the preceding variants, the component is a hydraulic coupling between the pump for circulating the liquid and at least one constituent liquid transport and heating tube of the liquid supply and/or distribution system. Such a tube comprises at least one heating element and this heating element forms a heat source from which the hydraulic coupling draws the calories that it drains to a single space delimited by the wall of the coupling, this space forming a liquid circulation channel.

According to a fourth variant, an alternative to or complementing the preceding variants of the invention, the component is a coupling device in which the space is in communication with at least one liquid inlet and at least one liquid outlet, said space housing at least one non-return valve. Advantageously, the space is in communication with two outlets to supply two pipes formed in the tube or the duct. Such a coupling device is an intermediate part situated between a tube coupled to the circulation pump and at least one liquid transport and heating duct coupled to the wiper.

Such a coupling device thus ensures the transition between a first part of the system situated under a hood of the vehicle and a second part situated outside the vehicle, the latter part housing the arms of the wiping installation.

According to a fifth variant, an alternative to or complementing the preceding variants, the component is a support for the coupling device, said support comprising at least one fastening device suitable for securing an electrical power supply connector of a constituent heating element of the supply and/or distribution system. It may in fact be advantageous to dissipate the calories over a greater surface area than that which surrounds the internal channels of a coupling device. This is why the invention covers a support which receives certain constituent components of the liquid supply and/or distribution system or of the wiping installation, this support being made of a heat-conducting plastic material.

Advantageously, the support and the coupling device form a single-piece part, the fastening device for example being made of the same material as the support. Also advantageously, the coupling device is made of the same material as the support.

According to a sixth variant, an alternative to or complementing the preceding variants, the component is a hydraulic connector installed between at least one constituent transport and heating duct of the supply and/or distribution device and a wiper of the wiping system. Such a hydraulic connector is threaded into a wiper attachment part and receives the liquid via one or more ducts fitted in a leak-tight manner onto an end of the hydraulic connector.

Advantageously, the hydraulic connector comprises at least one liquid circulation channel forming the space and a contact zone suitable for receiving a heating element. According to one example, the hydraulic connector comprises two liquid circulation channels forming the space, so as to spray the liquid onto the window on either side of the wiper.

The invention also covers a liquid supply and/or distribution system of a wiping installation for a motor vehicle, characterized in that it comprises at least one component such as that or those listed above. The invention thus covers a liquid supply and/or distribution system comprising a single component made of a heat-conducting material such as, in particular, the tank, the coupling device or the hydraulic connector.

It goes without saying that the invention also covers a supply and/or distribution system comprising liquid transport and heating tubes and ducts comprising a heating element and a plurality of components made of a heat-conducting plastic material, including a tank, a pump, a hydraulic coupling, a coupling device and a hydraulic connector.

One prime advantage according to the invention lies in the possibility of much more effectively heating a cold zone where ice is formed because all the periphery of the space is formed by a wall which transports the calories.

Another advantage lies in the possibility of reducing the electrical power needed to ensure the heating of this component since the latter is better distributed all around the space containing the liquid.

Figure 5:
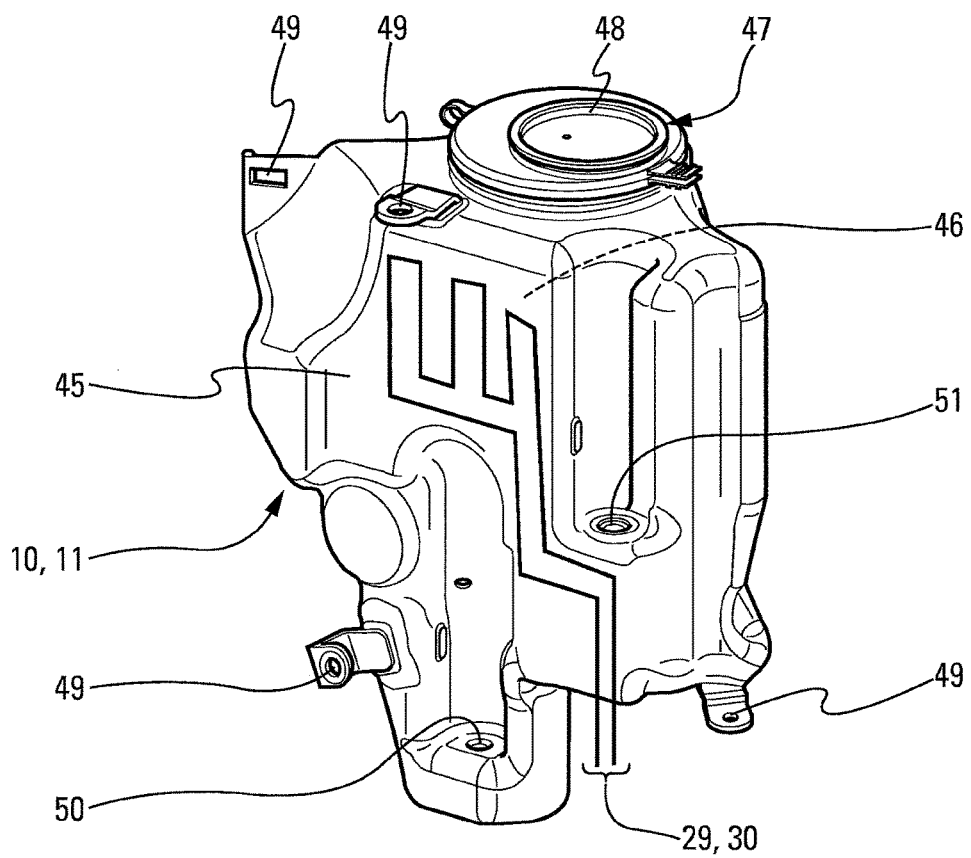
Figure 6:
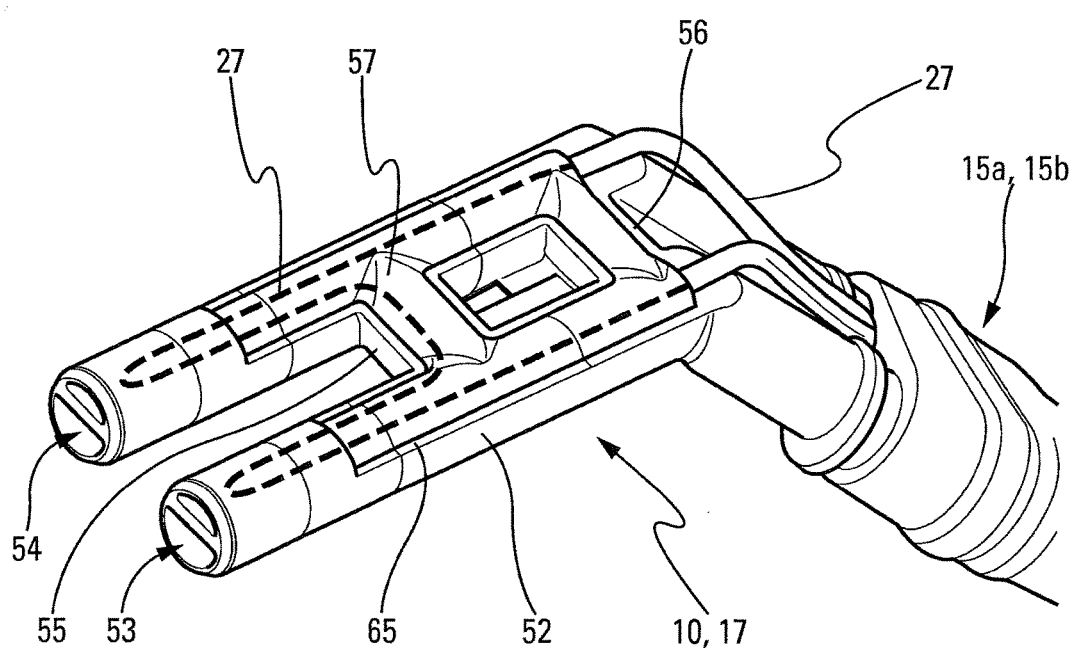

Other features, details and advantages of the invention will emerge more clearly on reading the description given below as an indication in relation to the drawings in which;

FIG. 1 is a general view of the liquid supply and/or distribution system and of the wiping installation, comprising at least one component according to the invention, FIG. 2 is a perspective view showing the support equipped with a coupling device according to the invention, FIG. 3 is a perspective view of a component according to the invention in the form of a pump, FIG. 4 is a perspective view showing a component according to the invention in the form of a hydraulic coupling, FIG. 5 is a perspective view of a component according to the invention in the form of a tank, FIG. 6 is a perspective view of a component according to the invention in the form of a hydraulic connector.

FIG. 1 is a view illustrating a windscreen 1 of a motor vehicle intended to be wiped by a wiping installation 2. The latter comprises a first arm 3 and a second arm 4 each linked, for example, to a rotation axis 5. These two arms move over the windscreen 1 in a combined to-and-fro motion or in an opposing to-and-fro motion.

At the end opposite the axis 5 relative to the first arm 3 and the second arm 4, there is a wiper 6 whose function is to scrape the windscreen to push back the water present thereon into areas of the windscreen which do not hamper visibility. These wipers 6 are linked to each arm by a removable connector allowing replacement of the wiper when the latter is worn.

The wipers comprise at least one liquid spraying boom, notably for spraying a windscreen-washing liquid. Advantageously, one and the same wiper comprises two spraying booms divided up on either side of its longitudinal axis of extension. These booms extend longitudinally in a same axis as a longitudinal axis of the wiper 6. These booms are arranged on either side of the wiper, along its longitudinal axis, so as to spray the windscreen-washing liquid in front of the wiper when the latter moves in a first direction of movement illustrated by the arrow 7 or in a second direction of movement illustrated by the arrow 8.

This FIG. 1 also shows the presence of a windscreen-washing liquid supply and/or distribution system 9 with which the vehicle is equipped. For the booms to spray this liquid, it is necessary to have a stock of windscreen-washing liquid, a means for transporting this liquid between the stock and the booms and a means for circulating this liquid from this stock to the booms.

The liquid supply and/or distribution system 9 comprises at least one component 10 made of a heat-conducting plastic material. The plastic nature of the material makes it possible to manufacture this component easily, for example by molding, while maintaining a cost price that is compatible with the economic constraints of the motor vehicle sector. The heat-conducting nature of the component guarantees that, when the latter is in contact with a heat source, the component is reheated, then this component is maintained at a temperature which prevents the liquid which spreads in the component from freezing.

The component 10 according to the invention thus comprises at least one space in which the liquid spreads, this space being edged or delimited by a wall. It will be understood from this that this space can be used to retain the liquid but it can also be passed through by this liquid when the liquid supply and/or distribution system 9 is actuated. This space forms a hollow delimited by the wall, the latter being made of a heat-conducting plastic material.

This component 10 can be, in particular:
a liquid retention tank 11,
a pump 12 for circulating the liquid in the supply and/or distribution system 9,
a hydraulic coupling 13 intended to link the pump 12 to a liquid transport and heating tube 18, a coupling device 14 installed between the tube 18 linked to the pump 12 and a liquid transport and heating duct 15 linked to the wiper 16, a support 16 suitable for mechanically joining the coupling device 14 and one or more electrical connectors which electrically supply the heating elements embedded inside the tube 18 and/or the duct 15 and heating elements incorporated in the wiper, a hydraulic connector 17 installed between at least the liquid transport and heating duct 15 and the wiper.

The liquid supply and/or distribution system 9 comprises the tube 18 and ducts 15. The tube 18 links the pump 12 to the coupling device 14. The ducts 15 link the coupling device 14 to the hydraulic connector 17, at the fastening of the wiper to the wiping arm.

For these two liquid transport means, it is a pipe, for example a flexible pipe, which delimits two channels 19 and 20 inside which the liquid can circulate. This tube 18 or these ducts 15 also comprise a heating element (not visible in FIG. 1) which runs along the channels either by being embedded in the constituent material of the pipe, or by running on the periphery and against the tube or the duct. Such a heating element is a resistive element, which for example takes the form of two electrical wire strands which, when passed through by an electrical current, gives off calories.

It will be noted that this heating element of the tube 18 or of the ducts 15 forms an example of a heat source from which the component 10 draws energy and dissipates it all around the space suitable for containing the liquid.

Alternatively, or complementing this first variant heat source, the components can notably comprise a heat source dedicated to each component and distinct from that used for the tube 18 or the ducts 15, the heat-conducting plastic material of the component 10 making it possible to drain the calories generated by the dedicated heat source.

FIG. 2 shows an exemplary embodiment of one or more components according to the invention.

This component 10 is notably a first coupling device 14a. It is delimited by a wall 58 which seals a space in which the liquid which spreads is in communication with a first inlet 21. The first inlet 21 receives one end of the first constituent channel 19 of the tube 18, the first inlet 21 penetrating into this first channel. This space is also in communication with a first outlet 23 and a second outlet 24 which are respectively coupled to a first pipe 66 of a first duct 15a and to a first pipe 67 of a second duct 15b, the first duct 15a and the second duct 15b being intended to transport and heat the liquid to the wipers.

Advantageously, a second coupling device 14b is provided, produced identically to the first coupling device 14a. The space inside the second coupling device 14b is in communication with a second inlet 22. The latter receives an end of a second constituent channel 20 with the first channel 19 of the tube 18, the second inlet 22 penetrating into the second channel. This space is also in communication with a third outlet 25 and a fourth outlet 26 which are respectively coupled to a second pipe 68 of the first duct 15a and to a second pipe 69 of the second duct 15b.

According to a variant of the invention, the first coupling device 14a straddles the second coupling device 14b. Although mechanically linked to the second coupling device 14b, the first coupling device 14a can be a part distinct from the second coupling device 14b. They can be mechanically joined to one another by a fastening element, notably formed by a support 16 or by a part distinct from the support 16.

According to the invention, the material used to manufacture the first coupling device 14a and/or the second coupling device 14b is plastic and heat-conducting, so as to drain the calories generated by heating elements 27 and/or 28 present in the first and second ducts 15a and 15b. Similarly, a heating element 29 which runs in or around the tube 18 forms a heat source exploited by the coupling devices to prevent the formation of ice in the internal space of these coupling devices.

The first coupling device 14a and/or the second coupling device 14b each comprise a non-return valve arranged in the space, that is to say between its inlet and its two outlets. Such a valve prevents the first and second channels 66 to 69 from emptying into the tank when the supply and/or distribution system is not being used. There is thus an assurance of the immediate availability of the windscreen-washing function, without waiting for the ducts 15a and/or 15b to be filled.

According to an alternative or complementary variant, the component 10 is produced by the support 16 made of a heat-conducting plastic. In addition to the heat conduction, this support 16 has a mechanical securing function for the coupling device or devices described above and for at least one electrical connector.

According to a variant, the heat source can be implemented by a dedicated source 30, for example arranged under the support 16 and in contact therewith. Alternatively or complementarily, the heat source can be implemented by the heating elements 27, 28 or 29, the routing of the strands then being organized for at least one of the heating elements to be in contact with the support 16.

The support 16 comprises a first cavity 31 in which the coupling device or devices 14a and 14b is/are housed, the latter being retained on the support 16 by a claw 32. It also comprises a second cavity 33 in which a first electrical connector 34 is housed and a third cavity 35 in which a second electrical connector 36 is installed.

The support 16 comprises, for each electrical connector, a fastening device 64 for the latter. It is, for example, a hook made of the same material as the support 16 which holds each electrical connector 34, 36 captive in the second cavity 33 or in the third cavity 35. As an illustration, the fastening means 64 comprises four hooks.

Each of these connectors comprises four ways, two of these ways being intended to supply the resistive heating elements installed on the wiper via a cable 70 whereas the other two ways electrically supply a heating element 27 or 28 which runs in the first duct 15a or in the second duct 15b.

According to a variant of the invention, the support 16 and the coupling device or devices 14a, 14b forms/form one and the same part. It will be understood from this that the support 16 and the coupling device are made of the same material and manufactured during one and the same molding operation. These two parts thus form a single-piece whole.

FIG. 3 shows a variant of the component 10 according to the invention. This component here takes the form of a pump 12 whose function is to ensure the circulation of the liquid in the supply and/or distribution system.

This pump 12 comprises a tubular body 37 which houses an electric motor supplied by an electrical connector 38. This body 37 also houses a turbine and ends with a hydraulic distributor 39, the latter comprising a first outlet 40 and a second outlet 41. The heat-conducting wall of the component according to the invention is here formed at least by the wall 60 of the hydraulic distributor 39, by a first part 61 of the tubular body 37 which surrounds the turbine and possibly by a second part 62 of the tubular body 37 which surrounds the electric motor. For its part, the space receiving the liquid is formed by the zone 63 where the liquid spreads in the pump 12, this space extends to the first part 61 which surrounds the turbine and/or inside the hydraulic distributor 39.

Thus, at least a part of the body 37 and the hydraulic distributor 39 of the pump are manufactured in a heat-conducting plastic material, which makes it possible to defrost the liquid present in the body 37 or the distributor 39, then prevent the liquid present in this hydraulic distributor 39, for example, freezing when the temperature surrounding the pump 12 becomes negative.

Here also, the heat source can be a dedicated source referenced 30 but this source can advantageously be provided by the heating element 29 which cooperates with the liquid transport and heating tube 18.

FIG. 4 illustrates another variant embodiment of the component 10. The latter takes the form of the hydraulic coupling 13 which ensures a hydraulic link between one or other of the outlets of the pump 40 or 41 and a constituent channel 19 or 20 of the liquid transport and heating tube 18.

The hydraulic coupling 13 is formed by a wall 43 which surrounds the space 44 in which the liquid circulates. The hydraulic coupling comprises two portions which extend, notably, in directions at right angles, a first portion being threaded into at least one channel 19, 20 of the tube 18 whereas a second portion formed by the wall 43 covers the outlet of the pump on which said second portion is mounted. Obviously, the two portions of the hydraulic coupling may be aligned on one and the same axis.

Such a hydraulic coupling is manufactured from a heat-conducting plastic material. A dedicated heat source 30 can be in physical contact with the hydraulic coupling 13 but this source can advantageously be produced by the heating element 29 which cooperates with the liquid transport and heating tube. Such a heating element 29 is attached to the hydraulic coupling 13 in such a way as to supply calories to the latter. In this figure, it can be seen that the heating element 29 is wound around at least one of the portions of the hydraulic coupling, and notably around the wall 43.

It will be noted, finally, that this hydraulic coupling 13 comprises rapid connection means on an end piece formed by the first outlet or the second outlet of the pump.

FIG. 5 shows a component 10 in a variant where it takes the form of a windscreen-washing liquid retention tank 11. In such a case, a wall 45 defines a space 46 in which the liquid is retained or stored with a view to its use.

Such a tank 11 comprises an orifice 47 for filling the space 46 with liquid. This orifice 47 is sealed by a stopper 48. This tank also comprises at least one fastening device 49 suitable for mechanically securing the tank on the vehicle, notably via screws.

The tank 11 also comprises a first hole 50 suitable for receiving the pump for circulating the liquid in the supply and/or distribution system. The tank comprises a second hole 51 intended to receive a second pump, notably used to spray the window-washing liquid onto the headlights of the vehicle or onto the rear window of the latter. In the extension of each of these holes, there is a recess which receives the body of the pump described above.

A dedicated heat source 30 can be in physical contact with the wall 45 of the tank 11, notably in the form of a resistive and heating track which runs on the outer face of this wall. Alternatively or complementarily, this heat source can be implemented by the heating element 29 which originates from the liquid transport and heating tube 18.

The wall 45 of the tank 11 is manufactured or molded from a heat-conducting plastic material, which makes it possible to distribute the calories generated by the heat source uniformly around the space 46 and thus prevent the formation of ice in the tank.

FIG. 6 also shows another variant embodiment of the component 10 according to the invention. The latter takes the form of a hydraulic connector 17 suitable for installation at the link between the wiper arm and the wiper. For a wiping system, there are thus two hydraulic connectors, each dedicated to a pairing formed by a wiper arm and a wiper.

Such a connector comprises a wall 52 which delimits a first space and a second space in which the liquid can spread or circulate. These are channels referenced 53 and 54 responsible for channeling the liquid between a first duct 15a, 15b dedicated to a wiper arm and an attachment part securely attached to the wiper.

The hydraulic connector 17 also comprises a first bridge 55 and a second bridge 56 which each extend between walls 52 delimiting the channels 53 and 54.

The constituent material of the hydraulic connector 17 is a heat-conducting plastic, which makes it possible to drain calories created by a heat source. According to an exemplary embodiment, such a heat source is implemented by the heating element 27 which runs in the first duct 15a securely attached to a wiper arm. This heating element bears physically on the hydraulic connector 17 in a contact zone 65, notably formed by a flat formed on the wall 52 of the hydraulic connector 17.

The heating element runs on the wall 52, at the contact zone 65, to an end of one of the channels opposite the first duct 15a, 15b, then passes over to the other channel by running on the first bridge 55. The resistive strand forming the heating element 27 is then directed to the end of the second channel opposite the first duct 15a, 15b. A supply of calories that the hydraulic connector 17 distributes in the space formed by the two channels 53 and 54 is thus assured.

It will be noted that the hydraulic connector 17 can comprise a reception means, notably made of the same material as the hydraulic connector 17, of an electrical connector intended to supply a heating device incorporated in the wiper. This is, for example, a loop or a hoop delimiting a volume in which this electrical connector extends.

According to an exemplary embodiment, the heating element 27 which runs on the component 10 is kept securely attached thereto by means of a resin 57, the latter extending over a top face of the hydraulic connector, notably in line with the contact zone 65.

Such a resin ensures the physical contact between the heat source and the component 10 according to the invention and protects the heating element from external attack, while preventing the user of the vehicle from being burned by handling the component 10.

The plastic material used to manufacture the component according to the variants detailed above is considered to be heat-conducting when its thermal diffusivity exceeds 0.00019 $m^2/s$. Such a plastic material is, for example, a charged polyethylene, for example charged with nanofibers.

According to another example, the material is a:
phenylene polysulfide (PPS FV 40) charged with glass fibers, notably to 40%, with a thermal diffusivity at least equal to 0.00019 $m^2/s$,
a polyoxymethylene with a thermal diffusivity at least equal to 0.00020 $m^2/s$,
a phenylene polysulfide (PPS) charged with glass fibers, notably to 40%, and charged with ceramic, with a thermal diffusivity at least equal to 0.00019 $m^2/s$,
a polyethylenimine (PEI) with a thermal diffusivity at least equal to 0.00033 $m^2/s$, a phenylene polysulfide (PPS) charged with long fibers with a thermal diffusivity at least equal to 0.00037 m²/s, a phenylene polysulfide (PPS M65) with 65% mineral charges with a thermal diffusivity at least equal to 0.00052 m²/s.

The invention claimed is:

1. A component of a liquid supply and/or distribution system of a wiping installation for a motor vehicle, comprising:
   a space delimited by a wall in which the liquid spreads, wherein the wall is made of a heat-conducting plastic material; and
   a dedicated heat source in physical contact with the wall, wherein the dedicated heat source is a resistive and heating track that extends along an outer face of the wall,
   wherein the plastic material is a polyethylene charged with nanofibers and exhibits a thermal diffusivity greater than or equal to 0.00019 m²/s.

2. The component as claimed in claim 1, the component forming a liquid retention tank, said wall comprising at least one orifice for filling said space with liquid and at least one hole suitable for receiving a pump for circulating the liquid in the supply and/or distribution system.

3. The component as claimed in claim 1, the component forming a pump for circulating the liquid in the supply and/or distribution system.

4. The component as claimed in claim 1, the component forming a hydraulic coupling between a pump for circulating the liquid and at least one constituent liquid transport and heating tube of the liquid supply and/or distribution system.

5. The component as claimed in claim 1, the component forming a coupling device in which the space is in communication with at least one liquid inlet and at least one liquid outlet, said space housing at least one non-return valve, wherein the space is in communication with at least two liquid outlets.

6. The component as claimed in claim 5, the component forming a support for the coupling device, said support comprising at least one fastening device suitable for securing an electrical power supply connector of at least one constituent heating element of the supply and/or distribution system.

7. The component as claimed in claim 6, in which the support and at least one coupling device form a single-piece part.

8. The component as claimed in claim 1, the component forming a hydraulic connector installed between at least one constituent liquid transport and heating duct of the supply and/or distribution device and a wiper of the wiping system.

9. The component as claimed in claim 8, in which the hydraulic connector comprises at least one liquid circulation channel forming the space and a contact zone suitable for receiving a heating element, wherein the hydraulic connector comprises at least two liquid circulation channels.

10. A liquid supply and/or distribution system of a wiping installation for a motor vehicle, comprising at least one component, said at least one component including:
    a space delimited by a wall in which the liquid spreads, wherein the wall is made of a heat-conducting plastic material; and
    a dedicated heat source in physical contact with the wall, wherein the dedicated heat source is a resistive and heating track that extends along an outer face of the wall,
    wherein the plastic material is a polyethylene charged with nanofibers and exhibits a thermal diffusivity greater than or equal to 0.00019 m²/s.

11. A component of a liquid supply and/or distribution system of a wiping installation for a motor vehicle, comprising:
    a space delimited by a wall in which the liquid spreads, wherein the wall is made of a heat-conducting plastic material; and
    a heat source in physical contact with the wall, wherein the heat source is a heating element that directly cooperates with a liquid transport and heating tube of the liquid supply and/or distribution system,
    wherein the plastic material is a polyethylene charged with nanofibers and exhibits a thermal diffusivity greater than or equal to 0.00019 m²/s.

12. A liquid supply and/or distribution system of a wiping installation for a motor vehicle comprising:
    at least one component, said at least one component including:
    a space delimited by a wall in which the liquid spreads, wherein the wall is made of a heat-conducting plastic material; and
    a heat source in physical contact with the wall, wherein the heat source is a heating element that directly cooperates with a liquid transport and heating tube of the liquid supply and/or distribution system,
    wherein the plastic material is a polyethylene charged with nanofibers and exhibits a thermal diffusivity greater than or equal to 0.00019 m²/s.

* * * * *